United States Patent [19]

Pion

[11] 4,336,825
[45] Jun. 29, 1982

[54] LIQUID LEVEL CONTROL SYSTEM

[75] Inventor: Russell F. Pion, Warren, R.I.

[73] Assignee: Factory Mutual Research Corporation, Norwood, Mass.

[21] Appl. No.: 160,275

[22] Filed: Jun. 17, 1980

[51] Int. Cl.³ .............................................. F16J 12/00
[52] U.S. Cl. .................................. 137/403; 137/412; 73/1 H; 73/4 R
[58] Field of Search ...................... 137/391, 386, 389; 73/301, 706, 1 H, 4 R, 299, 300

[56] References Cited

U.S. PATENT DOCUMENTS

| | | |
|---|---|---|
| 1,413,235 | 4/1922 | Novick . |
| 1,670,528 | 5/1928 | Joyce . |
| 2,336,205 | 12/1943 | Willauer .............................. 137/391 |
| 2,843,144 | 7/1958 | Robinson . |
| 3,774,150 | 11/1973 | Matsui ................................... 73/301 |
| 3,986,399 | 10/1976 | Satou ..................................... 73/706 |

*Primary Examiner*—Kyle L. Howell
*Assistant Examiner*—Denis E. Corr
*Attorney, Agent, or Firm*—Lane, Aitken, Kice & Kananen

[57] ABSTRACT

A system for controlling the water level in a boiler, including a liquid level adjuster, conduits connecting the liquid level adjuster to the boiler through housings mounted on the boiler and membranes positioned between the boiler and the conduits to transmit fluid pressure from the boiler to the liquid level adjuster while preventing fluid communication between the boiler and the liquid level control system. Valved bypass ducts extend from the housings to the top of the boiler so that expansion of the water in the liquid level control system due to the firing of the boiler is accommodated by overflow into the top of the boiler rather than by rupture of the membranes. Graduated water columns are provided to permit calibration of the liquid level adjuster, and valves are included in the liquid level control system adjacent to the liquid level adjuster so that the liquid level adjuster may be isolated from the rest of the system and checked for proper operation at any time.

14 Claims, 2 Drawing Figures

LIQUID LEVEL CONTROL SYSTEM

BACKGROUND OF THE INVENTION

This invention relates to a liquid level control system, and more particularly, to a boiler water level control system having a liquid level adjuster connected to the boiler by conduits, and film membranes positioned between the boiler and the conduits to transmit fluid pressure to the liquid level adjuster while preventing the passage of sludge, corrosive chemicals and other foreign matter from the boiler into the liquid level control system.

Water level control systems for boilers customarily include fluid pressure measuring instruments and conduits connecting the fluid pressure measuring instruments to the boiler. The fluid pressure measuring instruments operate a feedwater control valve which allows water to flow into the boiler to replace the water that leaves as steam. Corrosive chemicals which are present in the boiler water tend to corrode the conduits and the measuring instruments, and sludge which builds up in the boiler also builds up in the water level control system, clogging up both the instruments and the conduits connecting the instruments to the boiler, thereby rendering the system inoperative.

In the past, attempts were made to prevent the fouling due to the sludge by providing sludge pots for the control system and periodically blowing them down. During blowdown, water is allowed to rush out through the pots so that it loosens any sludge and carries it out of the pots. The provision of sludge pots has failed to prevent sludge from entering the control system, and the blowdown procedure is both inconvenient and costly. Furthermore, the entry of the corrosive chemicals into the control system from the boiler and the resultant damage to the conduits and the instruments has been unaffected by the use of sludge pots.

SUMMARY OF THE INVENTION

It is, therefore, an object of the present invention to provide a water level control system for a boiler which automatically controls the water level in the boiler while eliminating the need for control system sludge pots and the blowdown procedure.

It is a further object of the present invention to provide a water level control system which prevents the entry of sludge and corrosive chemicals from the boiler into the control system.

It is yet another object of the present invention to provide a water level control system for a boiler which accommodates expansion of the water in the system caused by the firing of the boiler.

It is a still further object of the present invention to provide a water level control system for a boiler which allows the testing of the fluid pressure measuring instruments at any time, regardless of the state of operation of the boiler.

Toward the fulfillment of these and other objects, the liquid level control system of the present invention comprises a liquid level adjuster connected by conduits to ports in the boiler and film membranes positioned between the conduits and the ports and capable of transmitting fluid pressure from the boiler to the liquid level adjuster while preventing fluid communication between the boiler and the control system. Thus, the film membranes prevent the passage of the sludge and the corrosive chemicals from the boiler to the control system.

The liquid level adjuster has a fluid pressure differential sensor and a transmitter which sends electric signals to an electrically operated control valve in a feedwater line to the boiler. The film membranes are enclosed in housings to which the conduits are connected.

Bypass ducts connect the housings to the top of the boiler to accommodate the expansion of the liquid in the control system that occurs when the boiler is fired up. Valves are provided in the conduits connecting the housings with the fluid level adjuster so that the adjuster may be isolated from the system and tested at any time. Graduated water columns communicate with the conduits connecting the housings to the liquid level adjuster to permit calibration of the liquid level adjuster when it is isolated from the system. A reservoir tank is positioned above the level at which the bypass ducts enter the top of the boiler, and is connected to the conduits connecting the housings to the liquid level adjuster, so that the liquid level control system can be refilled with water.

Accordingly, the liquid level control system senses differences in fluid pressure in the boiler while being protected from the build up of sludge and corrosive chemicals. Moreover, the liquid level control system is capable of accommodating the expansion of the fluid in the system due to the firing of the boiler. Furthermore, the liquid level adjuster may be isolated from the system for testing at any time.

DESCRIPTION OF THE PREFERRED EMBODIMENT

Figure 1:
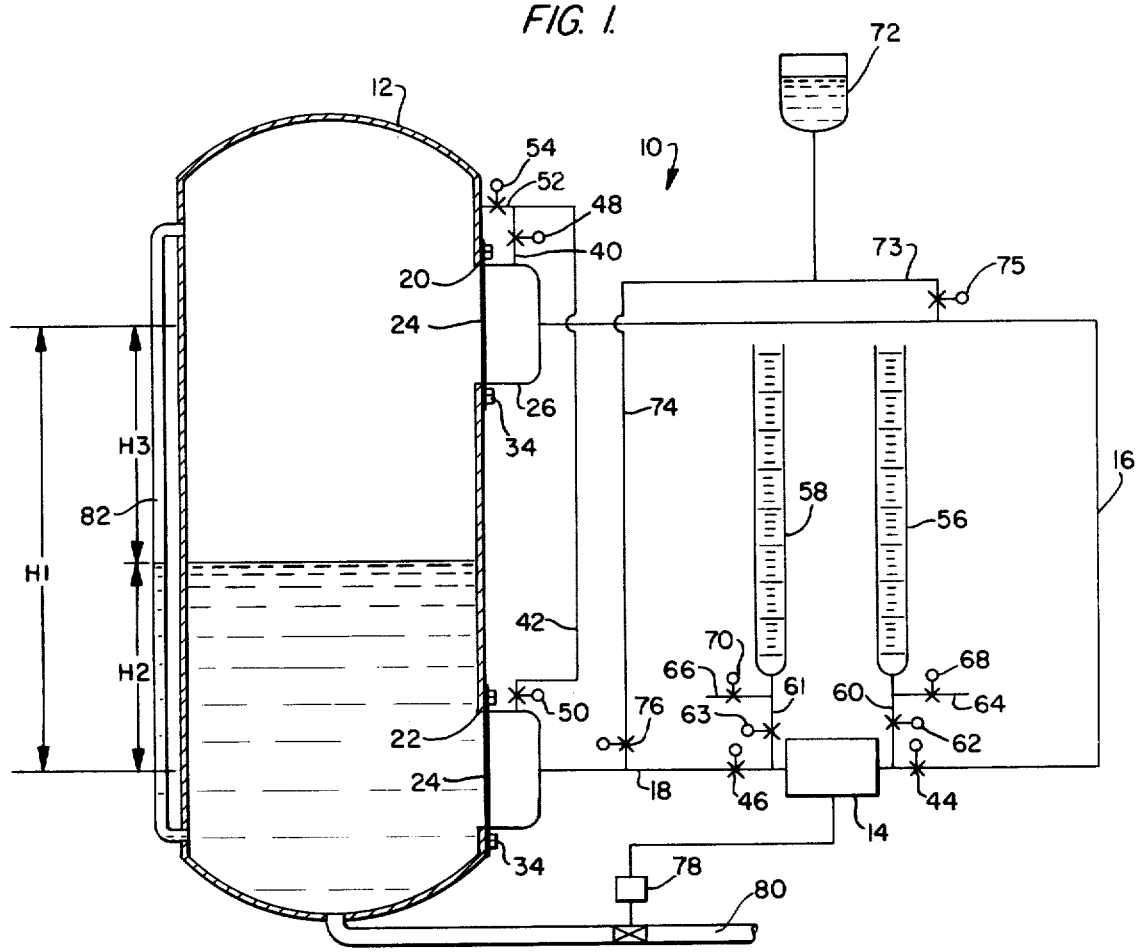
FIG. 1 is a schematic view of a boiler and the liquid level control system according to the present invention.
Figure 2:
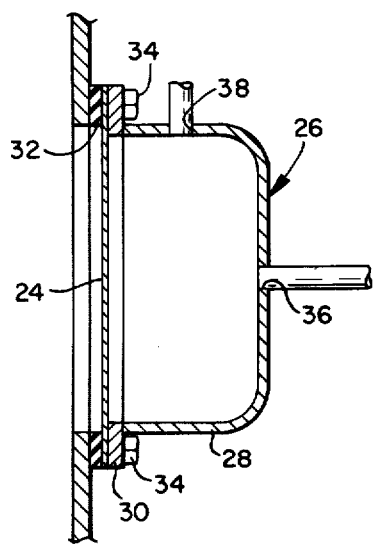
FIG. 2 is a cross-sectional view of a membrane and its housing.

In FIG. 1, the reference numeral 10 designates a water level control system for a boiler 12, including a liquid level adjuster 14 and first and second conduits 16 and 18, respectively, for conveying fluid pressure from the boiler 12 to opposite sides of the liquid level adjuster 14. The boiler 12 includes a first port 20 defined in an upper portion thereof and a second port 22 defined in a lower portion thereof. A film membrane 24 and a housing 26 are mounted across each of the ports 20 and 22. As is best shown in FIG. 2, each housing 26 has a dome 28 and a flange 30 integral with the dome 28. The flange 30 engages a portion of one face of the film membrane 24, the opposite face of which is in contact with a sealing device, such as a gasket 32. The film membrane 24 and the housing 26 are secured across their respective port 20 or 22 by bolts 34 or by any other suitable means.

The dome 28 of each housing 26 includes two apertures for placing the housing 26 in fluid communication with other portions of the water level control system 10. A first aperture 36, defined in the top of the dome 28, receives one of the conduits 16 or 18, which places the housing 26 in fluid communication with one side of the liquid level adjuster 14. The other aperture 38, formed elsewhere on the dome 28, receives one of two bypass ducts 40 or 42, which connects the housing 26 with the top of the boiler 12 to allow water from the control system 10 to overflow into the boiler 12. Thus, each housing 26 is in fluid communication with the top of the boiler 12 and is connected to opposite sides of the liquid level adjuster 14. Furthermore, valves 44 and 46 are positioned on opposite sides of the liquid level adjuster 14 in the conduits 16 and 18, respectively, so that the liquid level adjuster 14 can be isolated from the rest of the control system 10.

A valve 48 is positioned in the duct 40 between the upper housing 26 and the top of the boiler 12, and a valve 50 is positioned in the duct 42 between the lower housing 26 and the top of the boiler 12. The ducts 40 and 42 lead into a common duct 52 which enters the top of the boiler 12, and another valve 54 is placed in the common duct 52 near the point of entry into the boiler 12.

Graduated water columns 56 and 58, are connected by conduits 60 and 61 to the conduits 16 and 18, respectively, between the liquid level adjuster 14 and the valves 44 and 46. Valves 62 and 63 are positioned in the conduits 60 and 61, respectively, to allow the graduated water columns 56 and 58 to be selectively placed in an operative or non-operative condition. From the conduits 60 and 61 extend, respectively, branch lines 64 and 66 with valves 68 and 70 positioned therein, for draining the graduated water columns 56 and 58. The graduated water columns 56 and 58 can be used for calibrating the liquid level adjuster, as will be described hereinafter.

The water level control system 10 further includes a reservoir tank 72 to initially fill the control system 10 with liquid and to replenish the liquid in the control system 10, when necessary. The reservoir tank 72 is positioned at a level above the common duct 52 and connected to the conduits 16 and 18 by conduits 73 and 74 having valves 75 and 76, respectively, disposed therein.

The liquid level adjuster 14 is a differential pressure transmitter of a commercially available type, such as the Foxboro model 823 transmitter produced by the Foxboro Company, Foxboro, Massachusetts, or the Taylor model 3302TA transmitter produced by Sybron Inc., Rochester, N.Y. The liquid level adjuster 14 includes a sensor for perceiving fluid pressure and a transmitter for sending an electrical signal to a control device. In the system according to the preferred embodiment, the signals may be sent to a solenoid-operated inlet valve 78 mounted in a feedwater line 80 which conveys water to the boiler 12.

A sight glass 82 is mounted on the side of the boiler 12 in fluid communication with the water in the boiler to provide a visible indication of the level of water in the boiler.

The operation of the system is as follows. During the firing or start-up of the boiler 12, the three valves 48, 50 and 54 in the bypass ducts 40, 42 and 52 are opened, as are the valves 44 and 46 positioned in the conduits 16 and 18 near each side of the liquid level adjuster 14. The opening of these valves allows for the expansion of the water in all of the conduits of the control system and permits this water to overflow into the boiler 12 through the bypass ducts 40, 42 and 52.

The overflow provision protects the membranes 24 from possible rupture due to the excessive pressure differential which builds up between the control system conduits and the boiler 12 due to the expansion of the water upon the firing of the boiler 12.

The boiler 12 is started up with the water at a level about halfway up the height of the boiler 12 as can be determined by observation through the sight-glass 82. The rising heat in the boiler 12 will cause the water in the boiler 12 and in the water level control system 10 to expand. The expansion of the water in the boiler 12 is accommodated by an increase in the water level in the boiler 12. The expansion of the water in the water level control system 10 is accommodated by flowing into the bypass ducts 40, 42 and 52 and into the boiler 12.

When the boiler 12 reaches operating temperature and pressure, the three valves 48, 50 and 54 in the bypass ducts 40, 42 and 52 are closed, placing the boiler water control system 10 in operation. The steam pressure in the boiler 12 is exerted equally on the upper and lower membranes 24. Therefore, the liquid level adjuster 14 does not experience a differential pressure from the steam in the boiler 12. The height of water in the conduit 16 exerts a pressure on one side of the liquid level adjuster 14. This pressure is represented in FIG. 1 as $H_1$. The height of water in the boiler 12 exerts a pressure on the lower membrane 24 and causes the membrane 24 to deflect and to transmit the pressure through the fluid in the conduit 18 to the other side of the liquid level adjuster 14. This pressure, which is designated $H_2$, is variable. Thus, $H_3$ represents the difference in pressure between $H_1$ and $H_2$, which is the differential pressure that the liquid level adjuster 14 experiences, so that, as the boiler water level falls, the liquid level adjuster 14 senses an increase in the pressure differential, and therefore, sends a signal to the solenoid-operated inlet valve 78 to admit more water to raise the water level in the boiler 12. When the water level in the boiler 12 returns to its preset height, the liquid level adjuster 14 senses a decrease in the pressure differential and discontinues the signal to the solenoid-operated inlet valve 78 to stop the flow of water into the boiler 12.

The liquid level adjuster 14 can be checked for proper operation at any time: during hot steaming, during hot nonsteaming, or during cold shut-down. During hot steaming, the boiler must be placed in manual control and the boiler level must be maintained by visual indication through the sight-glass 86. At this time, the liquid level adjuster 14 is isolated from the rest of the system 10 by closing the valves 44 and 46.

The graduated water columns 56 and 58 can be placed in service by opening the valves 62 and 63 after the valves 44 and 46 are closed. The force then exerted on the opposite sides of the liquid level adjuster 14 is due solely to the height of the water in the graduated water columns 56 and 58. Since the force exerted by a known height of water is known, the liquid level adjuster 14 can be calibrated by comparing its output with the height of liquid in the graduated water columns 56 and 58. The water levels in the graduated water columns 56 and 58 can be varied by filling them through their tops or by draining them through the manipulation of the valves 68 and 70 in the drain lines 64 and 66.

During cool-down, the water in the conduits 16 and 18, connected to the liquid level adjuster 14, will change volume until the water reaches ambient temperature. When the boiler 12 is at atmospheric pressure, the conduits 16 and 18 can be refilled by opening the valves 48, 50 and 54 in the housing bypass ducts 40, 42 and 46, as well as the valves 75 and 76. The valves can then be closed.

Although it is apparent from the foregoing that the present invention is well adapted for application to boilers, it is understood that the scope of the present invention is not so limited, but rather extends to other liquid level control applications. Also, various other changes and modifications may be made without departing from the spirit and scope of the present invention as recited in the appended claims and their legal equivalent.

What is claimed is:

1. A system for controlling the level of liquid in a container comprising:
   first conduit means communicating with an upper portion of said container;
   second conduit means communicating with a lower portion of said container;
   control means connected to said first and second conduit means for responding to differential fluid pressure from said conduit means and adjusting the level of liquid in said container accordingly, said first and second conduit means being connected to means for calibrating the liquid level adjusting means; and
   means adjacent to said container and associated with each of said conduit means for transmitting the fluid pressure from said container portions, through said conduit means, to said control means while preventing fluid flow through said conduit means.

2. The system according to claim 1 wherein the transmitting means comprises a membrane positioned between the container and each of said first and second conduit means.

3. The system according to claim 1 wherein the first and second conduit means comprise conduits.

4. The system according to claim 2, further comprising a pair of ports in the container, each said membrane being mounted across one of said ports, and
   a housing mounted on said container over each said membrane.

5. The system according to claim 1 wherein the liquid level adjusting means includes a pressure differential sensor and means for sending an electric signal to actuate an electrically operated water inlet valve.

6. The system according to claim 4 wherein each housing has a dome portion and a flange portion connected to the dome portion and engaging the membrane, and a sealing means is positioned between each membrane and the container.

7. The system according to claim 4 wherein said first and second conduit means comprise first and second conduits and the housings mounted over their respective membranes.

8. The system according to claim 7 further comprising ducts placing the housings in fluid communication with the top of the container.

9. The system according to claim 1 wherein the calibrating means comprises graduated water columns and valves interposed between the graduated water columns and the first and second conduit means.

10. The system according to claim 3 wherein a valve is positioned adjacent to the adjusting means in each of the conduits so that the adjusting means can be selectively isolated from the rest of the control system.

11. A system for controlling the level of liquid in a boiler comprising:
    first fluid-filled conduit means communicating with an upper portion of said boiler;
    second fluid-filled conduit means communicating with a lower portion of said boiler;
    control means connected to said first and second conduit means for responding to differential fluid pressure from said conduit means and adjusting the level of liquid in said boiler accordingly;
    means adjacent to said boiler and associated with each of said conduit means for transmitting the fluid pressure from said boiler portions, through said conduit means, to said control means while preventing fluid flow through said conduit means; and
    overflow means for permitting fluid flow from the first and second conduit means to the boiler upon the firing of the boiler.

12. The apparatus of claim 11 wherein the control means includes a pressure differential sensor and means for sending an electric signal to actuate an electrically operated feedwater inlet valve.

13. The apparatus of claim 11 wherein the transmitting means comprises a membrane positioned between the boiler and each of said first and second conduit means.

14. The apparatus of claim 11, further comprising means for replenishing the fluid in the first and second conduit means.

* * * * *